United States Patent [19]
Hardtmann

[11] 3,923,996
[45] Dec. 2, 1975

[54] 3-SUBSTITUTED-OXINDOLES IN COMPOSITIONS AND METHODS OF TREATING OBESITY

[75] Inventor: Goetz E. Hardtmann, Florham Park, N.J.

[73] Assignee: Sandoz, Inc., E. Hanover, N.J.

[22] Filed: Nov. 12, 1973

[21] Appl. No.: 414,969

Related U.S. Application Data

[63] Continuation-in-part of Ser. No. 276,795, July 31, 1972, abandoned.

[52] U.S. Cl................................ 424/274; 260/325
[51] Int. Cl.².......................................... A61K 31/40
[58] Field of Search..................................... 424/274

[56] References Cited
OTHER PUBLICATIONS

Elderfield et al., Chemical. Abstracts 68:21772x (1968).

Seshadri et al., Chemical Abstracts 71:112731m (1969).

*Primary Examiner*—Norman A. Drezin
*Attorney, Agent, or Firm*—Gerald D. Sharkin; Richard E. Vila

[57] ABSTRACT

Disclosed are 3-formyloxindoles having pharmacological activity, particularly anti-obesity activity. The compounds may be prepared by hydrolysis of a 3-dimethylaminomethylene-1-formyloxindole, the latter prepared by reacting an oxindole with dimethylformamide and a phosphorous oxyhalide. The compounds may be also prepared by hydrolysis of a 3-ethoxymethyleneoxindole, the latter prepared by reacting an oxindole with triethyl orthoformate.

12 Claims, No Drawings

3-SUBSTITUTED-OXINDOLES IN COMPOSITIONS AND METHODS OF TREATING OBESITY

This application is a continuation-in-part of application Ser. No. 276,795, filed July 31, 1972, now abandoned.

The present invention relates to chemical compounds, in particular, to 3-substituted-oxindoles and their use as agents having pharmacological activity, particularly anti-obesity activity. It also relates to certain novel 3-substituted-oxindoles having such activity and also others useful as intermediates in preparing the active compounds, and to the preparation of said active compound from such intermediates. It also relates to pharmaceutical methods and compositions incorporating said pharmacologically active compounds.

The compounds 3-formyloxindole and its preparation have been previously disclosed in the literature, for example, by Behringer and Weissauer, Berichte 85, 774–777 but to my knowledge no pharmacological activity has been associated with said compound. Similarly, the compounds 4-chloro-3-formyloxindole and 4,7-dichloro-3-formyloxindole and their preparation have been previously disclosed, for example, by SESHADRI et al., Indian J. Chem. 7, 662(1969) but also to my knowledge no pharmacological activity has associated with said compounds.

I have now found that compounds of the formula I:

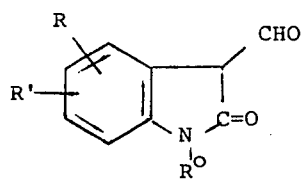

wherein
- $R^o$ is hydrogen or lower alkyl of 1 to 4 carbon atoms,
- R is halo of atomic weight of from 18 to 36, i.e. fluoro or chloro or lower alkoxy of 1 to 4 carbon atoms, and
- R' is hydrogen, halo of atomic weight of from 18 to 36, i.e. fluoro or chloro, or lower alkoxy of 1 to 4 carbon atoms, or
- R and R' together from methylenedioxy, have pharmacological activity in animals, particularly anti-obesity activity.

The compounds of the formula I in which $R^o$ is hydrogen may be prepared in a step A reaction by hydrolyzing a compound of either the formula II or III:

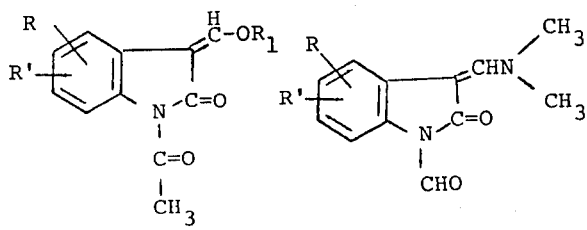

wherein R and R' are as defined and $R_1$ is lower alkyl of 1 to 4 carbon atoms.

The reaction of Step A may be conveniently carried out by subjecting a compound of the formulae II or III to the action of a strong base in the presence of water, preferably an inorganic base and more preferably an alkali metal hydroxide such as sodium hydroxide or potassium hydroxide. The reaction may be carried out at temperature in the range of 20°C. to 150°C., preferably 60°C. to 120°C. The hydrolysis may be carried out employing only water as the liquid reaction medium. However, an inert water miscible organic solvent, preferably an alcohol, such as ethanol, is preferably employed as a co-solvent. The product of the hydrolysis is acidified to obtain the desired compound of the formula I. Such acidification may be effected with any suitable acid, preferably a strong inorganic acid such as hydrochloric acid. The resulting product of the formula I may be isolated by working up by conventional procedures.

The compounds of the formula I in which $R^o$ is lower alkyl may also be readily prepared by subjecting a compound of the formula IIa:

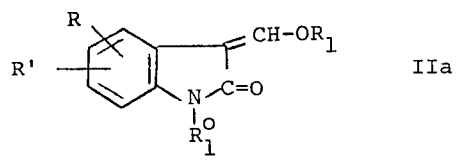

in which R, R' and $R_1$ are as defined and $R_1^o$ is alkyl of 1 to 4 carbon atoms, to hydrolysis in accordance with the reaction of Step A as above-described.

It has also been found that the compounds of the formula I may be prepared in a Step B reaction by reacting a corresponding compound of the formula IV:

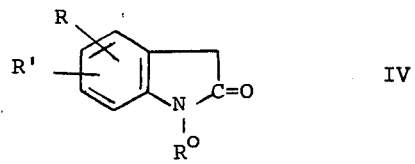

wherein R, R' and $R^o$ are as defined, with a compound of the formula V:

HCOOR₁     V wherein $R_1$ is as defined, in the presence of a strong base.

The Step B reaction is suitably effected at a temperature of from 20° to 120°C., preferably 40° to 100°C. in an inert solvent of conventional type, preferably an alcohol containing 1 to 6 carbon atoms, for example, ethanol. Suitable strong base include alkali metal alkoxides, such as sodium methoxide or potassium t-butoxide.

The compounds of the formula II and IIa may also be prepared from the corresponding oxindole of the formula IV:

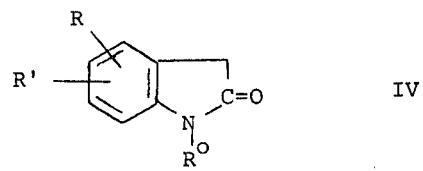

wherein R, R' and $R^o$ are as defined, according to the procedure described by Behringer et al., Berichte 85, 774–777, viz., by reacting a compound of the formula IV with acetic anhydride at elevated temperature, for example, 100°C. to 220°C., followed by reaction of the resulting product with a trialkyl orthoformate HC(OR$_1$)$_3$ in the presence of acetic anhydride at temperatures of from 100°C. to 150°C., preferably 100°C. to 130°C., provided, however, that the initial reaction with acetic anhydride is omitted when forming compounds IIa. The compounds of the formulae II and IIa may be isolated from the resulting reaction mixture by working up in a known manner.

The compounds of the formula III may be prepared by reacting a compound of the formula IV with dimethylformamide in the presence of a phosphorus oxyhalide or with the reaction product of dimethylformamide and a phosphorus oxyhalide. The reaction may be suitably carried out at temperatures in the range of from 20°C. to 220°C., preferably 30°C. to 180°C. Said reaction product is preferably employed. The reaction may be carried out employing excess dimethylformamide as the solvent for the reaction. Conventional inert organic solvents such as chloroform may be employed as solvents or as co-solvents. The reaction product of the formula III may be recovered from the resulting reaction mixture by working up by conventional procedures.

The compounds of formulae II, IIa, IV and V are either known or can be prepared by analogous methods from known starting materials.

As previously indicated, the compounds of formula (I) are useful because they possess pharmacological activity in animals. In particular, the compounds are useful as anti-obesity agents as indicated by glucose transport tests carried out on male Wistar rats which are dosed orally with 10–80 milligrams per kilogram of body weight of the test compound after at least 20 hours of fasting. One hour after receiving the drug each animal is sacrificed and the upper small intestine is removed and washed with glucose-saline. A 5 cm. section of the intestine is everted so that the muscosal surface is on the outside. One end of the segment is tied off and the center of the sac so formed is filled with oxygen saturated Kreb's biocarbonate buffer. The other end is then closed and the sac is incubated in 10 ml. of oxygen saturated bicarbonate buffer for 60 minutes at 37°C. Both the outside and inside solutions contain initially 0.3% of glucose. At the end of the incubation time, the glucose content of the outer (mucosal) and the inner (serosal) solution is determined using the standard Autoanalyzer procedure. Similar tests are run simultaneously with control animals. The percent inhibition of glucose transport caused by the drug is calculated from the formula:

$$I = \frac{S_t - M_t}{S_c - M_c} \times 100$$

where
I = percent inhibition;
$S_t$ = glucose concentration (mg.%) of serosal fluid at the end of an experiment in the drug-treated animal;
$S_c$ = glucose concentration (mg.%) of serosal fluid at the end of an experiment in the control animal;
$M_t$ = glucose concentration (mg.%) of mucosal fluid at the end of an experiment in the drug-treated animal; and
$M_c$ = glucose concentration (mg.%) of mucosal fluid at the end of an experiment in the control animal.

For such usage, compounds (I) may be administered orally or parenterally as such or admixed with conventional pharmaceutical carriers. They may be administered orally in such forms as tablets, dispersible powders, granules, capsules, syrups and elixirs, and parenterally as solutions, suspensions, dispersions, emulsions, and the like, e.g., a sterile injectable aqueous suspension. The pharmaceutical preparations may contain 1.0% up to about 90% of the active ingredient in combination with the carrier or adjuvant.

The anti-obesity effective dosage of active ingredient employed for the treatment of obesity may vary depending on the particular compound employed and the severity of the condition being treated. However, in general, satisfactory results are obtained when the compounds (I) are administered at a daily dosage of from about 0.3 milligrams to about 160 milligrams per kilogram of animal body weight, preferably given in divided doses two to four times a day, or in sustained release form. For most large animals in need of said treatment, the total daily dosage is from about 30 to about 1000 milligrams. Dosage forms suitable for internal use comprise from about 8 to about 500 milligrams of the active compound in intimate admixture with a solid or liquid pharmaceutically acceptable carrier or diluent.

The preferred pharmaceutical compositions from the standpoint of preparation and ease of administration are solid compositions, particularly hard-filled capsules and tablets.

Tablets and capsules containing the ingredients indicated below may be prepared by conventional techniques and are useful in treating obesity at a dose of one tablet or capsule 2 to 4 a day.

| Ingredients | Weight (mg.) Tablet | Capsule |
|---|---|---|
| 5-fluoro-3-formyloxindole | 50 | 50 |
| Tragacanth | 10 | — |
| Lactose | 197.5 | 250 |
| Corn starch | 25 | |
| Talcum | 15 | |
| Magnesium stearate | 2.5 | |

The following pharmaceutical compositions are formulated with the indicated amount of active agent using conventional techniques. The injectable suspension and the oral liquid suspension represent formulations useful as unit doses and may be administered in the treatment of obesity. The injectable suspension is suitable for administration once a day whereas the oral liquid suspension is suitably administered 2 to 4 times per day for this purpose.

| Ingredients | Sterile injectable suspension | Oral liquid suspension |
|---|---|---|
| 5-fluoro-3-formyloxindole | 50 (or less) | 50 (or less |
| sodium carboxy methyl cellulose U.S.P. | 1.25 | 12.5 |
| methyl cellulose | 0.4 | — |
| polyvinylpyrrolidone | 5 | — |
| lecithin | 3 | — |
| benzyl alcohol | 0.01 | — |
| magnesium aluminum Silicate | — | 47.5 |
| flavor — | q.s. | |
| color | — | q.s. |
| methyl paraben, U.S.P. | — | 4.5 |
| propyl paraben, U.S.P., | — | 1.0 |
| polysorbate 80 (e.g. Tween 80), U.S.P. | — | 5 |
| sorbitol solution, 70%, U.S.P. | — | 2,500 |
| buffer agent to adjust pH for desired stability | q.s. | q.s. |

-continued

| Ingredients | Sterile injectable suspension | Oral liquid suspension |
|---|---|---|
| water | for injection q.s. to 1 ml. | q.s. to |

The preferred compounds from the standpoint of anti-obesity activity are those in which R is halo at the 5-position of the oxindole with R' being hydrogen. The particularly preferred compound of the invention is 5-fluoro-3-formyloxindole.

It will be evident that the compounds of the formula I have an alternate tautomeric form which may be represented structurally by the formula I':

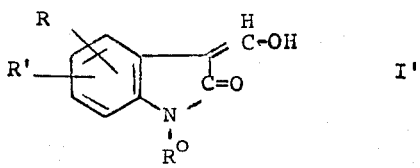

wherein R, R' and R⁰ are as defined.

It will also be evident that the compounds of the formula I when in the form of the compounds of the formula I' may form salts and the compounds of the formula I' and their pharmaceutically acceptable salt forms of the formula I'':

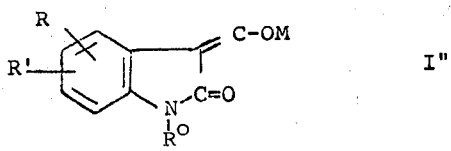

wherein R, R', R⁰ are as defined and M is a pharmaceutically acceptable salt-forming cation are useful as anti-obesity agents in the manner that the compounds of the formula I are so useful. Examples of suitable cations include the cations of sodium, potassium, lithium, calcium and the like. Such salts may be formed from the compounds of the formulae I or I' by conventional procedures and such salt forms of the formula I'' may be readily converted to the corresponding compounds of the formula I and I' by conventional procedures.

The following examples show representative compounds of the present invention and are given for purposes of illustration only.

EXAMPLE 1

5-chloro-3-formyloxindole

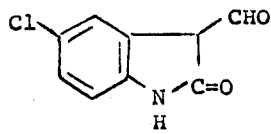

STEP A:

Preparation of
3-dimethylaminomethylene-1-formyloxindole

A suspension of 50 g. of 5-chloroxindole in 100 ml. of dimethylformamide and 100 ml. of chloroform is added slowly with stirring to a mixture prepared by adding 40 ml. of dimethylformamide under cooling (below 30°C.) to 60 ml. of phosphorus oxychloride. After refluxing for 90 minutes the reaction mixture is poured over ice/water, made basic with solid potassium carbonate and extracted with methylene chloride. The organic phase is dried, concentrated to 300–400 ml. volume to obtain a precipitate which is filtered off and washed with ether to obtain 3-dimethylaminomethylene-1-formyloxindole, m.p. 194°–198°C.

STEP B:

Preparation of 5-chloro-3-formyloxindole

A mixture of 3 g. of 3-dimethylaminomethylene-1-formyloxindole, 10 ml. of 50% sodium hydroxide solution, 10 ml. of water and 35 ml. of ethanol is heated on a steam bath for 1 hour after which the condenser is removed and heating continued for another 2 hours. Water is added to loosen the resulting thick precipitate and then the precipitate is dissolved with heating in about 250 ml. of water followed by acidification with 6N hydrochloric acid to obtain the title compound from its sodium salt. The resulting precipitate is filtered off, washed twice with water, twice with ether, dried under vacuum at 50°C. overnight and purified by boiling in dioxane, cooling and filtering off the precipitate which is washed with ethanol and then ether to obtain 5-chloro-3-formyloxindole, m.p. 281°–282°C. (decomp.).

EXAMPLE 2

5-chloro-3-formyloxindole

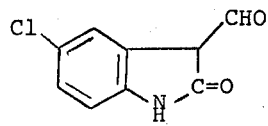

STEP A:

Preparation of 5-chloro-3-ethoxymethylene-oxindole

A solution of 130 g. of 5-chloro-oxindole in 260 ml. of acetic anhydride is refluxed for 5 hours, and cooled to 100°C. for the addition of a solution of 148 g. of triethyl orthoformate in 500 ml. of acetic anhydride. The resulting mixture is heated to 110°–120°C. on an oil bath for 8 hours, then cooled, and the crystalline precipitate collected by filtration. The mother liquor is concentrated to recover additional precipitate. The precipitated material is twice recrystallized from acetic anhydride to obtain 1-acetyl-5-chloro-3-ethoxymethylene-oxindole.

STEP B:

Preparation of 5-chloro-3-formyloxindole

To a solution of 46 g. of 1-acetyl-5-chloro-3-ethoxymethylene-oxindole in 500 ml. of hot ethanol is added in portions a solution of 16 g. of sodium hydroxide in 30 ml. of water. After heating on a steam bath for 10 minutes the mixture is allowed to stand at room temperature for 1 hour. The precipitated material is collected by filtration and additional precipitate collected by concentrating the mother liquor. The precipitated material is suspended in water, made slightly acidic with 2N hydrochloric acid, the resulting precipitate collected by filtration, washed and dried in under high vacuum at 70°C. for 24 hours to obtain 5-chloro-3-formyloxindole, m.p. 286°–289°C. (decomp.).

EXAMPLE 3

Following the procedures of the foregoing Examples 1 and 2, the following compounds are prepared:
a. 5-fluoro-3-formyloxindole, m.p. 257°–258°C.
b. 5,7-dichloro-3-formyloxindole.
c. 5-methoxy-3-formyloxindole, m.p. 223°–225°C.
d. 4-chloro-3-formyloxindole, m.p. 205°–207°C.
e. 4,7-dichloro-3-formyloxindole.
f. 5,6-dichloro-3-formyloxindole, m.p. 290°–295°C.
g. 6-chloro-3-formyloxindole, m.p. 223°–225°C.
h. 4-methoxy-3-formyloxindole, m.p. 178°–180°C.
i. 6-methoxy-3-formyloxindole, m.p. 231°–233°C.
j. 6-fluoro-3-formyloxindole, m.p. 206°–208°C.
k. 7-chloro-3-formyloxindole, m.p. 252°–254°C.
l. 6,7-dimethoxy-3-formyloxindole, m.p. 221°–223°C.
m. 6,7-methylenedioxy-3-formyloxindole, m.p. 250°–253°C.
n. 3-dimethylaminomethylene-5-fluoro-1-formyloxindole.
o. 3-dimethylaminomethylene-5,7-dichloro-1-formyloxindole.
p. 3-dimethylaminomethylene-5-methoxy-1-formyloxindole.
q. 3-dimethylaminomethylene-4-chloro-1-formyloxindole.
r. 3-dimethylaminomethylene-4,7-dichloro-1-formyloxindole.
s. 3-dimethylaminomethylene-5,6-dichloro-1-formyloxindole.
t. 3-dimethylaminomethylene-6-chloro-1-formyloxindole.
u. 3-dimethylaminomethylene-4-methoxy-1-formyloxindole.
v. 3-dimethylaminomethylene-6-methoxy-1-formyloxindole.
w. 3-dimethylaminomethylene-6-fluoro-1-formyloxindole.
x. 3-dimethylaminomethylene-7-chloro-1-formyloxindole.
y. 3-dimethylaminomethylene-6,7-methoxy-1-formyloxindole.
z. 3-dimethylaminomethylene-6,7-methylenedioxy-1-formyloxindole.

EXAMPLE 4

4-Methoxy-3-formyloxindole

A solution of 16 g. of 4-methoxyoxindole in 30 ml. of ethyl formate is added to a mixture prepared from the reaction of 3.1 g. of metallic sodium and 50 ml. of ethanol. The resulting mixture is heated at 85°C. for 2 hours, cooled on an ice-bath and neutralized with 5N hydrochloric acid. The resulting mixture is then extracted twice with 100 ml. of methylene chloride and the combined organic extracts re-extracted with saturated sodium chloride solution. After drying and evaporating in vacuo, the residue is crystallized from methylene chloride/ethyl acetate to obtain 4-methoxy-3-formyloxindole, m.p. 178°–180°C.

EXAMPLE 5

Following the procedure of Example 4, the following compound is prepared:

A. 6,7-methylenedioxy-3-formyloxindole, m.p. 250°–253°C.

EXAMPLE 6

5-Fluoro-1-methyl-3-formyloxindole

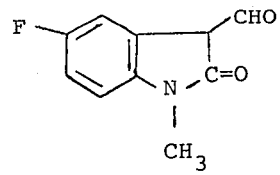

STEP A:

Preparation of 5-fluoro-1-methyl-3-ethoxymethylene-oxindole

A mixture of 10.0 g. of 5-fluoro-1-methyloxindole, 11.0 g. of triethylorthoformate and 50 ml. of acetic anhydride is stirred at 120°C. for 12 hours. The resulting mixture is evaporated in vacuo to remove solvent and obtain an oil which slowly crystallizes to give 5-fluoro-1-methyl-3-ethoxymethylene-oxindole.

STEP B:

Preparation of 5-fluoro-1-methyl-3-formyloxindole

A solution of 8.0 g. of 5-fluoro-1-methyl-3-ethoxymethylene-oxindole in 100 ml. of ethanol is treated with 1.5 g. of sodium hydroxide in 5.0 ml. of water and the resulting mixture heated on a steam bath for 5 minutes. After cooling, the ethanol is removed by evaporation in vacuo and the resulting solid is dissolved with heating in 400 ml. of water, treated with charcoal, filtered, acidified with 2N hydrochloric acid and the resulting precipitate is recovered by filtering, washed three times with water and dried to obtain 5-fluoro-1-methyl-3-formyloxindole, m.p. 228°–231°C.

EXAMPLE 7

Following the procedure of Example 6, the following compounds are prepared:
A. 5-fluoro-1-ethyl-3-formyloxindole
B. 5-chloro-1-methyl-3-formyloxindole.

What is claimed is:

1. The method of treating obesity in obese animals comprising administering to said animal an anti-obesity effective amount of a compound of the formula:

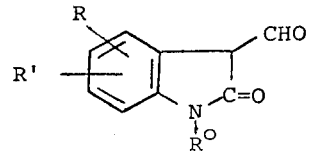

wherein
R° is hydrogen or alkyl of 1 to 4 carbon atoms,
R is halo of atomic weight of from 18 to 36 or alkoxy of 1 to 4 carbon atoms, and
R' is hydrogen, halo of atomic weight of from 18 to 36 or alkoxy of 1 to 4 carbon atoms, or
R and R' together form methylenedioxy,
or a pharmaceutically acceptable salt thereof.

2. The method of claim 1 in which the compound administered is a compound in which R° is hydrogen and R' is hydrogen or halo.

3. The method of claim 1 in which the compound is administered at a daily dose of from 30 to 1000 milligrams.

4. The method of claim 3 in which the compound is 5-chloro-3-formyloxindole.

5. The method of claim 3 in which the compound is 5-fluoro-3-formyloxindole.

6. A pharmaceutical composition for treatment of obesity comprising a solid orally administerable pharmaceutically acceptable carrier and an anti-obesity effective amount of a compound of the formula

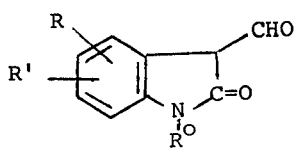

wherein
R, R' and $R^o$ are as defined in claim 1.

7. A composition in accordance with claim 6 in which the compound is a compound in which $R^o$ is hydrogen and R' is hydrogen or halo.

8. A composition in accordance with claim 6 in which the compound comprises between 1% to 90% of the total weight of the composition.

9. A composition in accordance with claim 6 in which the compound is present in an amount between 30 to 1000 milligrams.

10. A composition in accordance with claim 6 in unit dosage form and in which the compound is present in an amount between 8 to 500 milligrams.

11. A composition in accordance with claim 10 in which the compound is 5-chloro-3-formyloxindole.

12. A composition in accordance with claim 10 in which the compound is 5-fluoro-3-formyloxindole.

* * * * *